TAPE FEED SYSTEM

Filed July 19, 1965 2 Sheets-Sheet 1

INVENTOR
JAMES J. MURPHY
BY
AGENT 3,342,430
TAPE FEED SYSTEM
James J. Murphy, Philadelphia, Pa., assignor to Sperry Rand Corporation, New York, N.Y., a corporation of Delaware
Filed July 19, 1965, Ser. No. 473,095
8 Claims. (Cl. 242—55.12)

ABSTRACT OF THE DISCLOSURE

A tape loop control system for magnetic tape handlers is disclosed. The handler includes a pair of tape loop boxes and a pair of reel motors. The control system includes a means for alternately sampling the loop length in each of the loop boxes and of generating a pair of electrical signals corresponding to the respective loop lengths. These signals are then applied through a common amplifier system and switching network to each of the reel motors to thereby control the respective loop lengths.

The invention hereinafter described and claimed has to do with tape feed systems, but more particularly to magnetic tape transport systems which are useful in electronic computers or the like.

Because of the necessity in such systems for the tape to be fed at a relative fast speed from a dead start, there is normally provided a loop of slack tape against which the mechanism works to relieve it of web tension as would be present if the tape had to be drawn directly from the tape reels. Tape loops are provided both for the supply and the take-up reels.

Prior art tape feed mechanisms are satisfactory in most respects, but because of duplication of control elements for the two tape loops they are expensive.

Therefore it is the primary object of the present invention to provide an improved tape feed system for controlling the tape loop lengths.

Another object of the invention is to provide a tape feed mechanism which is characterized by its simplicity and low cost.

A further, and more specific object of the invention is to provide an improved tape transport mechanism in which the control system is reduced to a minimum.

In accordance with the above and first briefly described, the invention comprises a control system which alternately samples or "observes" the loop length in a pair of tape loop boxes into and out of which tape is fed by motor driven capstans and tape supply and take-up reels, and drives the tape reels in directions to maintain the loops at the desired correct length.

Figure 1:
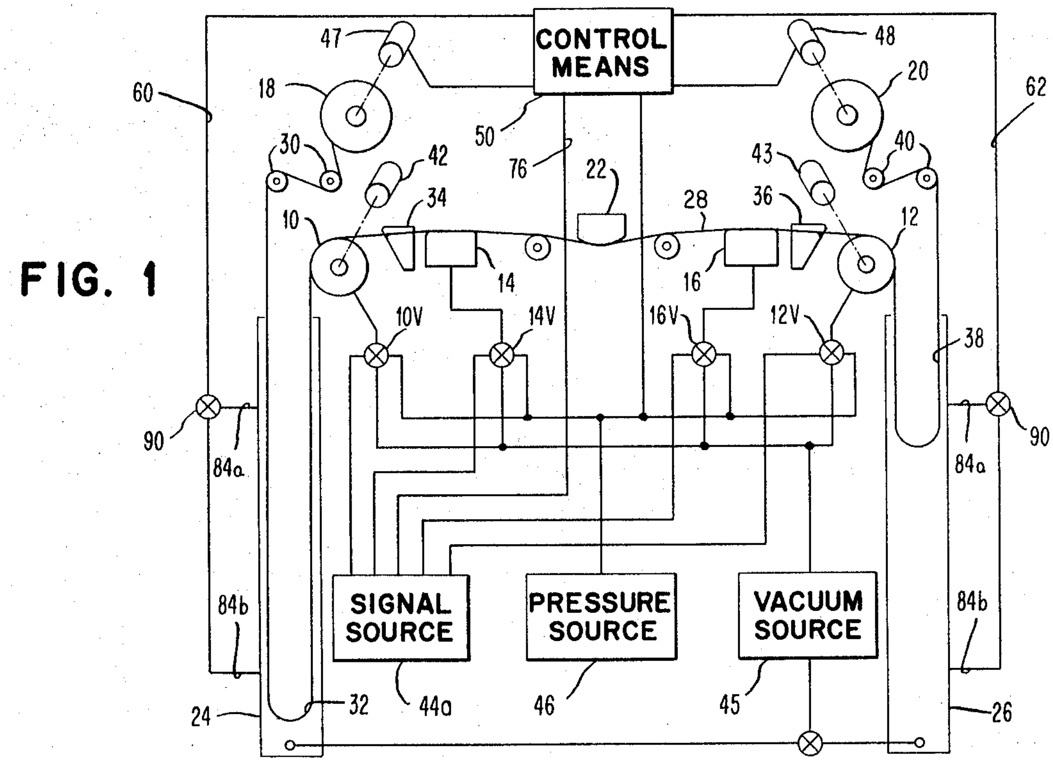
FIGURE 1 is a diagrammatic view of a tape unit incorporating the invention.

Referring first to FIGURE 1, it is seen that the tape unit comprises a pair of pneumatic capstans 10 and 12, a pair of pneumatic brakes 14 and 16, tape supply and tape-up reels 18 and 20, magnetic recording or read-write heads 22, and a pair of tape loop boxes 24 and 26. Magnetic tape 28, from supply reel 18, is threaded over idler rollers 30 to form a loop 32 in loop box 24, then over capstan 10, edge guide 34, brake 14, past head 22, over brake 16, edge guide 36, capstan 12 and into a loop 38 in loop box 26 from which it passes over idler rollers 40 to the take-up reel 20. In accordance with demand the tape is moved selectively by capstans 10 and 12 in either direction. In operation, the capstans 10 and 12 are driven in opposite directions, counterclockwise and clockwise respectively, by motors 42 and 43. Start and stop drive of the tape by the capstans is effected by the selective application of vacuum and pressure to the capstans and brakes in accordance with the system described in the copending application entitled "Fluid Tape Drive System," Ser. No. 452,188, filed Apr. 30, 1965, now U.S. Patent 3,291,410, in the name of Richard E. Berryman, and assigned to the same assignee as the present invention.

Briefly, however, as controlled by the signal source 44*a*, drive to the left is effected by applying vacuum from source 45 through valve 10V to capstan 10, and pressure from source 46 through valves 12V, 14V and 16V to capstan 12 and brakes 14 and 16. To stop the tape when so moving, vacuum is applied to brake 16 and pressure to the two capstans and the other brake. The reverse is true with respect to tape drives to the right when vacuum is applied to capstan 12 and pressure to capstan 10 and the brakes 14 and 16. To stop the tape, vacuum is applied to brake 14 and pressure to the capstans and the other brake.

In accordance with the present invention the supply and take-up reels are driven by motors 47 and 48, activated by control means generally indicated at 50 and responsive to the tape loop lengths in the loop boxes, and in the manner now to be described in connection with the other figures of drawings.

Figure 2:
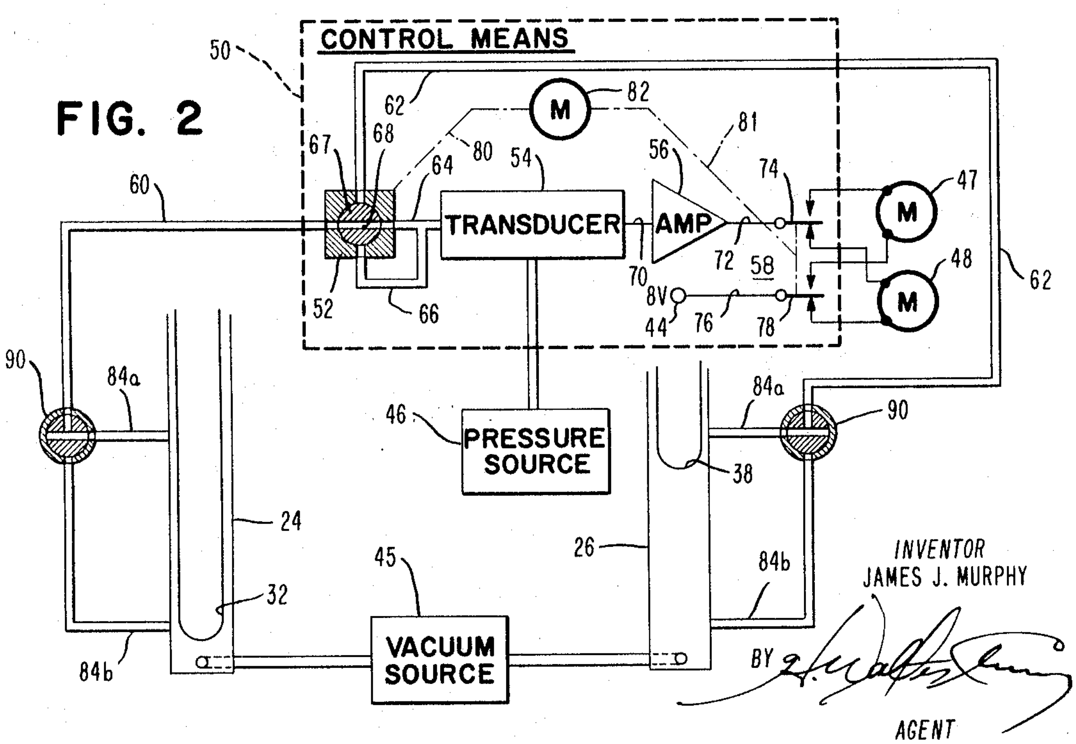
FIGURE 2 is a diagrammatic view of one form of the invention.

In FIGURE 2 it is seen that the loop control mechanism comprises the rotary fluid valve 52, the fluid (pneumatic) to electrical transducer 54, the amplifier 56, and the double pole, double throw switch 58. The rotary fluid valve 52 is connected to the loop boxes 24 and 26 by way of fluid conduits 60 and 62 and to the transducer by way of conduits 64 and 66. As the rotary element 67 of the valve rotates, its conduit 68 alternately connects the transducer 54 with each loop box thus to sense or "observe" the length of the loop in the box as a function of the pressure difference across the transducer. This pressure difference between the air pressure from source 46 on one side of the transducer, and the air pressure in conduits 64 and 66 on the other side, causes the transducer to produce an electrical output as a function of the difference. As described in more detail below, the signals produced by the transducer are forwarded over wire 70 to the amplifier 56 from which they flow over wire 72 to one pole 74 of switch 58 which directs them to the proper motor 47 or 48 to drive the reels. The direction, forward or backward, is determined by the relationship of the loop box signal with a loop position reference signal flowing from the signal source 44 over wire 76 to the other pole 78 of switch 58. Transducer 54 may be of any of many well known types, such, for example, where a movable member such as a diaphragm or piston divides a chamber into two compartments one of which is exposed to the pressure from source 46 and the other from the loop boxes. Pressure differences in the chambers causes the movable member to actuate the contact arm of a potentiometer thus to produce an output whose value is a function of the pressure difference across the movable member.

As indicated by the broken lines 80 and 81, the rotary element 67 of valve 52, and the switch 58 are operated in synchronism by a motor 82. In other words, the valve 52 is rotated—say, for example, at twenty c.p.s.—thus alternately to connect each loop box to the transducer twenty times each second. At the same time, switch 58, which may also be of a rotary type, is alternately interconnecting each reel motor 47 and 48 to the amplifier 56 twenty times each second. Each time loop box 24 is sensed, only the motor 47 is connected in circuit with the reference signal and the signal from the amplifier, and each time box 26 is sensed, only motor 48 is in the circuit. It will be understood that motor 82 rotates at a higher rate of speed than motors 47 and 48 are capable of—typically two c.p.s.

During operation, if the tape loop 38 is over the top outlet opening 84*a*—as seen in box 26—cutting off the air flow in conduit 62, the resultant signal produced by the transducer 54 will be positive relative to the reference signal. This positive signal will effect a forward drive of the reel motor 48 until the loop has been shortened sufficiently to uncover the opening 84*a*. At this time, a signal is produced which is negative relative to the reference signal and the reel motor is driven in the opposite, or reverse direction to lengthen the loop. Thus, it is seen that the loop lengths will cycle between short and long lengths determined by the positions of the tape loops, relative to the openings 84. With valve 90 as shown, a similar operation is effected relative to the bottom opening 84*b* in box 24.

Figure 3:
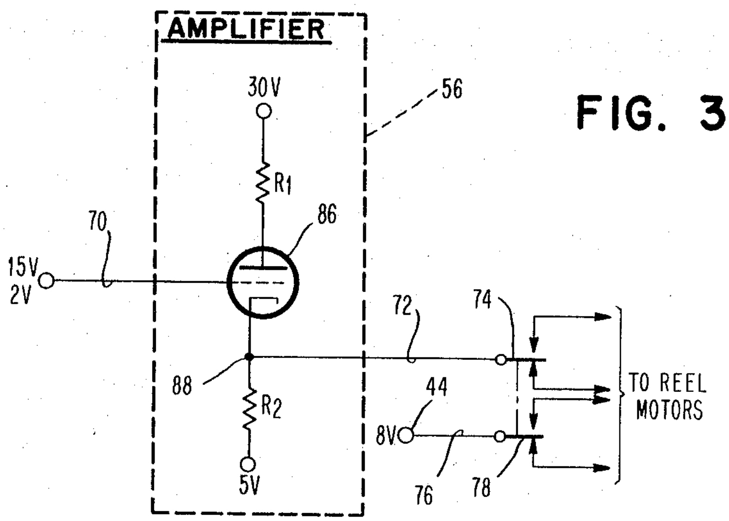
FIGURE 3 is a schematic view of an amplifier suitable for use in the invention.

Accordingly, and by way of example, the amplifier might be constructed as shown in FIGURE 3. Here it is seen that the reference signal voltage on line 76 is 8 v., the signals produced by the transducer and conducted over wire 70 to the amplifier are 15 v. and 2 v., respectively, and the terminal voltages on the plate and cathode of tube 86 in the amplifier 56 are 30 v. and 5 v., respectively.

Thus, it is seen that with a potential of 15 v. on line 70, the voltage drop across the resistor R1 and the tube is such that the potential at terminal 88 is more positive than the 8 v. reference signal, hence the motor 48 is driven in the forward direction to shorten the tape loop. When the loop unblocks opening 84*a*, the output of the transducer on wire 70 is 2 volts, and the drop across the tube and resistor R2 is such that the potential at terminal 88 is more negative than the reference potential of 8 v., and the motor is driven in the backward direction to lengthen the loop.

It will be understood that by reason of the rotation of valve 52, the driving potential on the reel motors is a series of pulses occurring at the rate of twenty per second. It will also be understood, that both motors may be driving in the same direction or oppositely. Each is driven in the direction called for by the tape condition in its associated loop box as alternately sensed at the twenty c.p.s. rate.

Thus, the two loops may be maintained at the same length or at different lengths, depending upon the position of openings 84 therein. In most applications, they are normally maintained at different lengths, short in one box and long in the other. As seen in FIGURE 2, signal controlled rotary valves 90 may be provided in conduits 60 and 62 to control the loop length in each box by connecting the conduits to control openings 84*a* at the top for short loops and 84*b* at the bottom for long loops.

Figure 4:
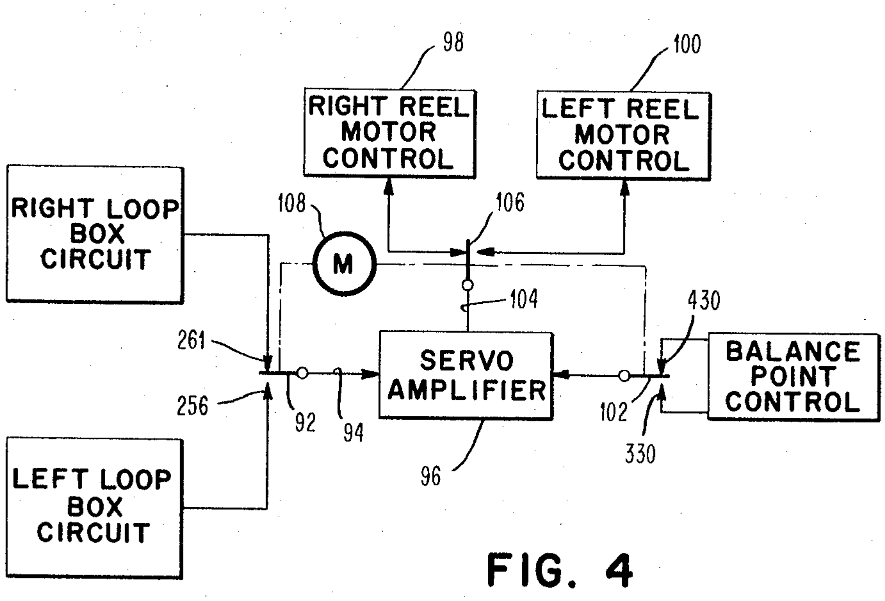
FIGURE 4 is a diagrammatic view of another embodiment of the invention.

It will be realized, of course, that even though the invention has been described above in association with a pneumatic to electric transducer, it can equally and as effectively be employed in connection with other types of loop length detectors or sensors. For example, it may be used in a loop control system such as described in assignee's Wooldridge Patent No. 3,137,453, in the manner shown in block diagram in FIGURE 4 of the present application. In this figure, the same reference characters used in the patent are used where applicable.

In accordance with the teaching of Wooldridge, the loop box circuits are effective to provide potentials at terminals 256 and 261 which are representative of the length of the tape loop in the respective boxes. In the patent these potentials are fed into separate servo amplifiers where, in cooperation with balance point control signals, they control operation of the right and left reel motors.

In the present invention, the potentials at terminals 256 and 261 are alternately looked at, or sensed by the switch 92 at a predetermined rate, say for example twenty c.p.s., and fed through conductor 94 into a single servo amplifier 96, common to both reel motors 98 and 100. Balance point control signals for the two tape loops are alternately fed into the common servo amplifier 96 over terminals 330 and 430 and switch 102 to cooperate with the signals from the loop boxes in the manner described in the patent. Signals from the servo amplifier 96 flow through conductor 104 and switch 106 into the appropriate reel motor. In the present showing the various switches (92, 102, and 106) may be considered to be of the rotary type driven in synchronism by a motor 108. It will be understood however, that this is exemplary only and that they could be electronically operated switches, such as flip-flops. In either case, the switches are operative alternately to effect complete control of the right and the left reel motors in accordance with the length of the tape loops in the respective loop boxes in the same manner as accomplished by Wooldridge, but with only one servo amplifier.

The transducer 54, by way of example, might be one such as manufactured by International Resistor Corporation, Philadelphia, Pa., under the title "Potentiometer Type Pressure Transducer," Model No. 70–21X3. A similar transducer is manufactured by the Fairchild Instruments Corporation, Mountainview, Calif., under the Model No. TP300.

I claim:

1. In a magnetic tape system wherein tape is moved in either of two opposite directions from one motor driven tape reel to another motor driven tape reel past magnetic transducer means by capstan drive means, and wherein loops of tape are formed in loop boxes positioned between each reel and the capstan means whereby the capstan draws tape from the loop in one loop box and feeds it to the loop in the other loop box, the combination therewith of (A) control means responsive to the length of the tape loops in said loop boxes to control the tape reel motors to drive in forward or reverse directions either to shorten or lengthen the tape loops in the respective boxes to maintain them at an approximate desired length in said loop boxes; said means comprising;

(a) means for alternately and sucessively sensing the length of the loop in each of the loop boxes;

(b) means responsive to said sensing to convert the tape loop length in each box into a signal whose strength changes with the loop length;

(c) means for alternately and successively interconnecting each of the reel motors to the signal produced by the sensing of the respective loop box; and (d) means responsive to certain of the signals produced by said sensing to drive the respective reel motors in a forward direction and to other of the signals to drive the respective reel motors in the reverse direction.

2. In a magnetic tape system wherein tape is moved in either of two opposite directions from one motor driven tape reel to another motor driven tape reel past magnetic transducer means by capstan drive means, and wherein loops of tape are formed in loop boxes between each reel and the capstan means whereby the capstan draws tape from the loop in one loop box and feeds it to the loop in the other loop box, the combination therewith of (A) control means responsive to the length of the tape loops in said loop boxes to control the tape reel motors to drive in forward or reverse directions either to shorten or lengthen the tape loop in the respective boxes to maintain them at an approximate desired length in said loop boxes; said means comprising:

(a) means for alternately and successively sensing the length of the loop in each of the loop boxes;

(b) means responsive to said sensing to convert the tape loop length into a high or low signal depending upon the loop length;

(c) means for providing a reference signal having a value between said high and low signals;

(d) means for alternately and successively interconnecting each of the reel motors to the reference signal and to the signal produced by the sensing of the loop length in the loop box associated with each reel, whereby the respective reel motor is driven in a forward or reverse direction dependent upon the signal value relative to the reference signal, thereby to shorten or lengthen the loop.

3. In a magnetic tape system wherein tape is moved in either of two opposite directions from one motor driven tape reel to another motor driven tape reel past magnetic transducer means by capstan drive means, and wherein loops of tape are formed in loop boxes between each reel and the capstan means whereby the capstan draws tape from the loop in one loop box and feeds it to the loop in the other loop box, the combination therewith of (A) control means responsive to the length of the tape loops in said loop boxes to control the tape reel motors to drive in forward or reverse directions either to shorten or lengthen the tape loop in the respective boxes to maintain them at an approximate desired length in said loop boxes; said means comprising:

(a) means for alternately and successively sensing the length of the loop in each of the loop boxes;

(b) means responsive to said sensing to convert the tape loop length into a high or low signal voltage depending upon the loop length;

(c) means for providing a reference signal voltage having a value between said high and low electrical signals;

(d) means for alternately and successively interconnecting each of the reel motors in circuit with the reference signal voltage and the electrical signal produced by the sensing of the loop length in the respective loop box associated with each reel, whereby the reel motor is driven in a forward or reverse direction depending upon the value of the signal voltage relative to the reference signal voltage, thereby to shorten or lengthen the loop.

4. A magnetic tape system according to claim 3 wherein said loop boxes are subjected to low pressure on one side of said tape loop and higher pressure on the other thereby to subject said tape loop to a pressure difference in a direction to draw it into said boxes, and wherein said converting means (b) of claim 3 comprises:

(A) a transducer for converting pneumatic pressure to an electrical output whose value is high or low depending upon the length of the loop being sensed; and the sensing means (a) in claim 3 comprises:

(B) pneumatic conduit means for successively and individually connecting said loop boxes at points of desired loop length with said transducer, whereby the pneumatic pressure in the respective loop boxes at said points of connection of said conduit means may be alternately transmitted to said transducer thereby to be converted into a high or low signal depending upon the loop length at the connection point being sensed.

5. A magnetic tape system in accordance with claim 4, wherein the pneumatic means (B) incorporates:

(A) a rotary valve having a fluid conduit arranged alternately during each rotation to interconnect the pneumatic conduit means of said loop boxes to said transducer; and the circuit interconnecting means (d) of claim 3 comprises:

(B) switch means; and (C) motor means for rotating said valve means and for simultaneously operating said switch means whereby sensing of the loop length in each loop box is synchronized with the interconnection of its associated reel motor with said signal and reference voltages.

6. A system according to claim 5 wherein said switch means (B) comprises:

(A) a rotary switch.

7. A system according to claim 4 wherein the pneumatic conduit means (B) comprises:

(A) a plurality of conduits connected to each of said loop boxes at different points along its length; and (B) valve means for selectively and alternately interconnecting only one of the conduits of each box to said transducer.

8. A magnetic tape system according to claim 3 wherein: the sensing means (a) comprises:

(A) means for sensing the loop length at selected different points along the length of the loop box whereby the loop length in the respective boxes might be altered.

References Cited

UNITED STATES PATENTS 2,921,753 1/1960 Lahti et al. -------- 242—55.12
3,137,453 6/1964 Wooldridge -------- 242—55.12

LEONARD D. CHRISTIAN, *Primary Examiner.*